United States Patent [19]

Johnson

[11] Patent Number: 4,515,377
[45] Date of Patent: May 7, 1985

[54] ROTARY SEAL ASSEMBLY HAVING A LIQUID FILLED BELLOWS

[76] Inventor: Leslie V. Johnson, P.O. Box 34137, Jeppestown 2043, Transvaal, South Africa

[21] Appl. No.: 514,087

[22] Filed: Jul. 15, 1983

[30] Foreign Application Priority Data

Aug. 6, 1982 [ZA] South Africa .................. 82/5715
Sep. 9, 1982 [ZA] South Africa .................. 82/6622

[51] Int. Cl.$^3$ .................. F16J 15/36; F16J 15/48
[52] U.S. Cl. .................. 277/27; 277/59; 277/65; 277/88
[58] Field of Search .................. 277/38–43, 277/59, 65, 81 R, 86, 88–90, 27

[56] References Cited

U.S. PATENT DOCUMENTS

| | | | |
|---|---|---|---|
| 1,876,520 | 9/1932 | Newkirk et al. | 277/88 X |
| 2,010,930 | 8/1935 | Rowe | 277/90 X |
| 2,276,622 | 3/1942 | Leake | 277/86 |
| 2,326,824 | 8/1943 | Browne et al. | 277/88 X |
| 2,912,265 | 11/1959 | Brummer | 277/88 X |
| 3,074,728 | 1/1963 | Freed | 277/90 X |
| 3,333,856 | 8/1967 | Voitik | 277/59 |
| 3,567,231 | 3/1971 | Albert | 277/59 X |
| 3,811,688 | 5/1974 | Smith | 277/39 |

FOREIGN PATENT DOCUMENTS

| | | | |
|---|---|---|---|
| 564714 | 10/1944 | United Kingdom | 277/86 |
| 812046 | 4/1959 | United Kingdom | 277/89 |
| 629390 | 10/1978 | U.S.S.R. | 277/86 |

Primary Examiner—Robert S. Ward
Attorney, Agent, or Firm—Stevens, Davis, Miller & Mosher

[57] ABSTRACT

A rotary seal assembly for sealing a rotating shaft, such as the shaft of a centrifugal pump. The assembly has a first sealing element fast on the shaft and a second sealing element arranged non-rotatably but axially movably next to the first element. On that side of the elements towards the pressure fluid which is to be sealed, there is a barrier, and there is an inlet for pressurized service liquid into the annular space between the elements and the barrier. The pressure of the service liquid forces the second element into sealing contact with the first and also provides a liquid barrier separating the elements from the pressure fluid which is being sealed. This feature is useful when abrasive slurries are being pumped, since the slurry is refused access to the elements.

5 Claims, 2 Drawing Figures

U.S. Patent
May 7, 1985
4,515,377
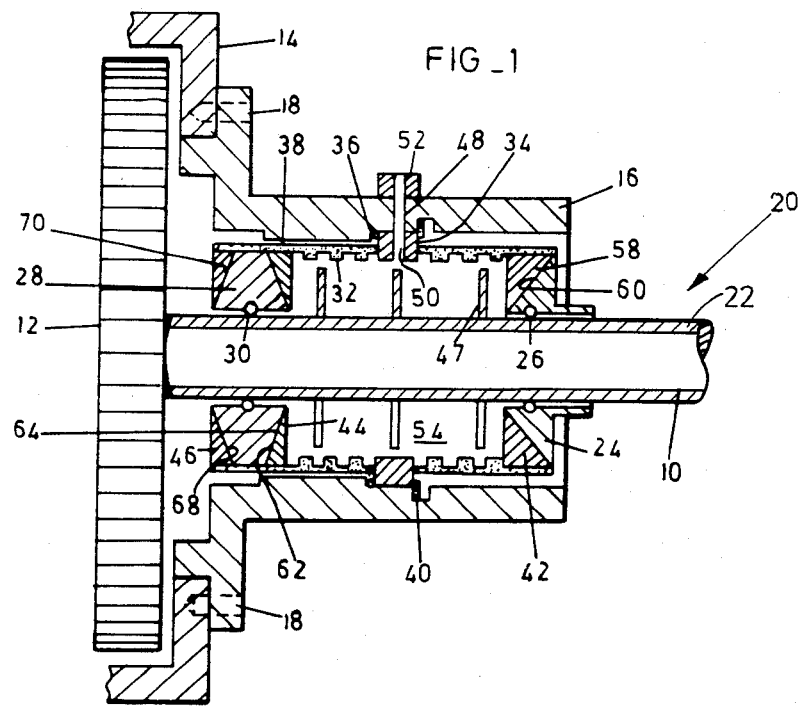
FIG_1
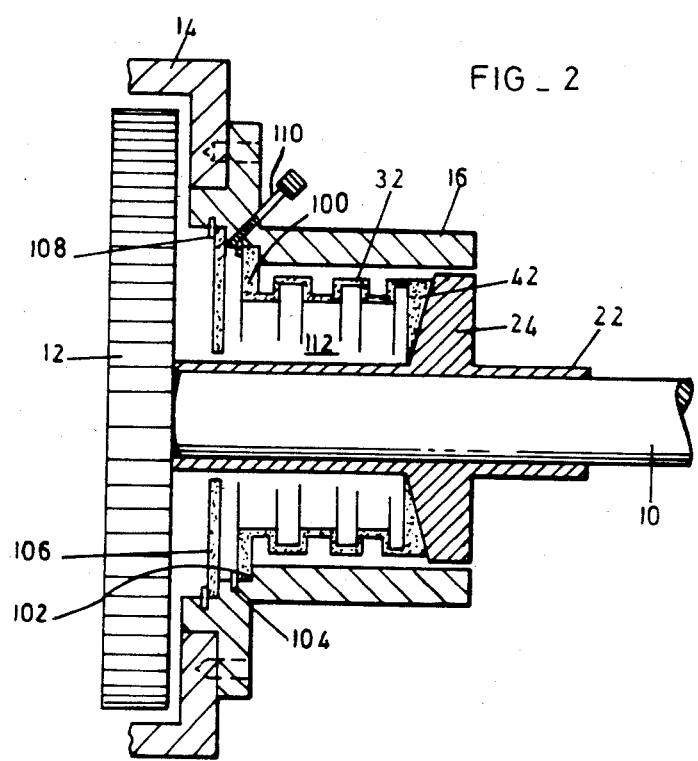
FIG_2

ROTARY SEAL ASSEMBLY HAVING A LIQUID FILLED BELLOWS

BACKGROUND TO THE INVENTION

This invention relates to a rotary seal assembly for preventing fluid leakage between a shaft of a rotating machine and a fixed housing through which the shaft passes. The seal of the invention is particularly suited to applications where solid-containing or corrosive fluids, such as the slurries commonly encountered in mineral processing operations, are being pumped, but it also finds application with less difficult liquids.

In conventional clear liquid pumping applications stuffing boxes or packed glands are commonly used to provide the required seal. With seals of this type, there is rapid wear, especially if a slurry is pumped, and a continuous requirement for large volumes of high pressure clean gland service water.

In another type of seal assembly commonly used, there is a sealing element arranged on the shaft and another sealing element which is non-rotatable. The sealing element on the shaft is biased towards the stationary element by a spring, usually in the form of an annular bellows. The problem with known arrangements of this sort, when used in slurry pumping applications, is that the bellows is exposed to the pumped slurry with the result that it clogs up and its operation is hampered. It is for this very reason that the bellows is attached to the rotating sealing element so that the movement of the bellows assists somewhat in freeing it from fouling. In slurry pumping operations using known seals of this sort, the slurry also has access to the sealing surfaces of the elements, with the result that they wear quickly. To counter this, service water is injected continuously at high pressure directly into the vicinity of the sealing elements to keep them free of slurry. Where the pump's operating pressure is, say, 4 bar, the injected water may have to have a pressure of around 18 bar. Besides the disadvantage that very high pressure water is required, a great volume of water is wasted with continuous injection and undesired dilution of the pumped liquid takes place. If the high pressure supply of service water should fail, or should its pressure drop, as commonly happens in practice, rapid wear of the sealing surfaces takes place as the slurry abrades them. In the conventional arrangements, the sealing surfaces are all arranged to be at right angles to the pump axis, and it is believed that this configuration enhances the rapid wear which takes place under such conditions.

It is an object of this invention, at least in some embodiments, to alleviate the problems outlined above.

SUMMARY OF THE INVENTION

The invention provides a rotary seal assembly for sealing the shaft of a rotating machine to a housing through which the shaft passes rotatably from the interior to the exterior of a fluid space which will, in operation of the machine, contain fluid under pressure, the assembly comprising a first sealing element locatable fast with the shaft, a second sealing element for location non-rotatably on the side of the first sealing element towards the fluid space with complementary sealing surfaces on the elements in opposition to one another, barrier means for location axially away from the sealing elements with the barrier means and the sealing elements defining the ends of a service liquid compartment between the fluid space and the sealing elements, a spring for arrangement non-rotatably about the liquid service compartment and for connection to the second sealing element to urge it axially towards the first sealing element, and an inlet into the service liquid compartment for the introduction of pressurised service liquid into the compartment to force the second sealing element into sealing contact with the first sealing element and to provide a liquid barrier separating fluid in the fluid space from the sealing elements.

Preferably the sealing surfaces of the first and second sealing elements have tapered shapes.

The spring may be in the form of an annular bellows spaced in use away from the shaft and extending between the second sealing element and the barrier means to define an outer wall for the service liquid compartment.

The barrier means may include a third sealing element fast with the shaft and a fourth sealing element arranged non-rotatably on the side of the third sealing element towards the service liquid compartment for movement into sealing contact with the third sealing element under the influence of the pressure of the service liquid in the compartment. With this arrangement, the spring may be connected at one end to the fourth sealing element to urge the fourth sealing element towards the third sealing element.

Preferably, the assembly includes a fifth sealing element arranged non-rotatably on the side of the third sealing element towards the fluid space for movement into sealing contact with the third sealing element under the influence of fluid pressure in the fluid space.

In another embodiment the barrier means is in the form of an annular disc for location transversely to the shaft with its outer edge engaged with the housing, and the spring is in the form of an annular bellows for arrangement about the service liquid compartment with one end connected to the second sealing element and with the other end fastened to the housing.

The invention also provides a rotary seal assembly for accommodation in a housing surounding a shaft of a rotating machine and for sealing the shaft with respect to the housing, the assembly including a cartridge having an outer annular formation engageable non-rotatably in a fluid-tight manner in the housing, an axially extending sprung bellows connected to the formation and extending axially to either side thereof, axially movable annular sealing elements carried in use at either end of the bellows, so that they are biased away from one another by the bellows further sealing elements for location fast on the shaft for rotation therewith outwardly of the axially movable bellows, the bellows and sealing elements defining an annular service liquid compartment around the shaft, and an inlet for the introduction of a pressurized service liquid into the compartment which liquid acts in use in combination with the bellows to urge the axially movable elements outwardly into sealing contact with the elements fast on the shaft and thereby to create a sealed annulus of service liquid about the shaft inwardly of the bellows.

BRIEF DESCRIPTION OF THE DRAWINGS

FIG. 1 shows a schematic view in longitudinal section above the axis of a pump shaft fitted with a rotary seal assembly of the invention; and FIG. 2 shows a similar longitudinal sectional schematic view of another embodiment.

DESCRIPTION OF PREFERRED EMBODIMENTS

In FIG. 1, the numeral 10 designates the shaft of a conventional centrifugal pump, the shaft carrying at its inner end an impeller 12 within the pump casing 14. The shaft passes outwardly through the casing 14 and through a housing 16 fastened to the casing by means of bolts 18.

A rotary seal assembly according to the invention, and shown generally at 20, is fitted to the housing and shaft within the housing. The assembly has a sleeve 22 keyed or otherwise fitted to the shaft for rotation with the shaft. An annular, tapered sealing element 24 is mounted fast on the sleeve and is sealed with respect to the sleeve by means of an O-ring 26. At a distance away from the element 24, there is a further annular sealing element 28, which is also mounted fast on the sleeve and sealed with respect to it by an O-ring 30. The sealing element 28 has the double tapered shape shown.

A sprung bellows 32 of annular shape is held against rotation within the housing 16 by an annular rib 34 which fits tightly into the housing in a fluid tight manner. On one side, the rib 34 abuts a shoulder 36 formed by a thickened portion 38 of the housing wall, and is retained in position by a circlip 40 seating in an annular groove in the housing wall. An O-ring is interposed between the shoulder 36 and the rib 34. The bellows is connected to the inner edge of the rib 34 and extends axially in both directions from the rib. At its outer end, the bellows carries a sealing element 42 having a tapered shape, and at its inner end it carries another sealing element 44 also with tapered shape. The action of the bellows is therefore to urge the sealing elements 42 and 44 outwardly towards the sealing elements 24 and 28. The sealing elements 42 and 44 can therefore move in the axial direction, but are not rotatable.

The bellows 32 carries another sealing element 46 of tapered configuration at its inner end. Each of the elements 42, 44 and 46 is held firmly to the bellows. Extending radially outwardly from the sleeve 22 is a series of agitators 47, in the form of fingers which extend part of the distance towards the bellows. Extending through the wall of the housing 16 is a threaded port 48, which registers with a threaded port 50 extending through the rib 34. A service water injection nipple 52 is threaded into these ports. A source of pressurized service water (not shown) is connected to the nipple 52.

The bellows 32 define the outer wall of a service water compartment 54, with the sealing elements 24 and 42 defining the outer end of the compartment, and with the sealing elements 28 and 44 defining the inner end of the compartment.

The operation of this seal assembly is as follows: Service water is injected under pressure into the compartment 54, where it serves to force the tapered sealing surface 58 of the element 42 into sealing contact with the tapered sealing surface 60 of the element 24, and to force the tapered sealing surface 62 of the element 44 into sealing contact with the tapered sealing surface 64 of the element 28. This action is aided by the biasing force exerted on the elements 42 and 44 by the bellows 32.

The result is that the compartment 54 is completely sealed. In order to maintain the seal, there is no need for continuous injection of fresh service water. The compartment 54 contains a finite volume of service water (about one liter in practice). The service water serves to maintain the seal, and also to lubricate and cool the relatively rotating sealing faces, and to separate the sealing elements 24 and 42 from the fluid in the casing 14.

In practice, the service water will be maintained slightly above the operating pressure of the pump i.e. the fluid pressure in the casing 14. Should the service liquid pressure in the compartment 54 drop below the pump's operating pressure, there is a danger that fluid from the casing 14 could enter into the compartment under pressure and contact the sealing surfaces. When the fluid being pumped is particularly abrasive or corrosive, as is the case, for instance, with the slurry from ore processing works, this is most undesirable and could lead to premature wear of the parts.

In this embodiment, this problem is countered by the provision of the extra sealing element 46, which will be moved axially by the fluid within the casing 14 until its sealing surface 68 makes sealing contact with the sealing surface 70 of the element 28, to prevent the entry of the pumped fluid into the service water compartment. It has been found that even if the service water injection fails completely and slurry does enter into the compartment 54 the seal which is generated between the elements 24 and 42 as a combined result of the actions of the pressurized slurry and the bellows is adequate for acceptable periods of time. It is believed that the tapered configuration of the sealing elements assists in the prevention of premature wear. In this situation, the agitators, on the sleeve serve to agitate the slurry and aid in the prevention of clogging up of the bellows with the solid particles.

An important advantage of the seal described is the fact that there is no requirement for continuous service water injection. This precludes the possibility of undesired pumped product dilution, and, of course, saves water. When the product pumped is a clear liquid, such as water, which will not harm the sealing surfaces of the elements if it does come into contact with them, it is possible to do away with the elements 28, 44 and 46. For this reason, it is preferred that these elements be removable at will from the seal assembly if it is to be used in such applications. Sealing will be provided by the mating of the surfaces 58 and 60 under the combined effect of the bellows and the pumped liquid, no service water injection being required.

The assembly shown in FIG. 1 can be installed in the housing in a simple manner, the shoulder 36 serving to provide a simple indication of the correct positioning of the components.

The configuration shown in FIG. 2 is similar in many respects to that shown in FIG. 1. Corresponding parts are indicated with the same reference numerals as in FIG. 1. Here, the bellows 32 is fitted with a radial flange 100 which seats against a shoulder 102 of the housing, and is retained there by a circlip 104. The sealing element 42 is formed integrally with the bellows, and the element 24 is formed integrally with the sleeve 22. Instead of the sealing system constituted by the elements 44 and 28 in FIG. 1, there is a baffle 106 which seats tightly against the wall of the housing and is retained there by a circlip 108. Service water is injected through a nipple 110 into a service water compartment 112, where its functions are to cause sealing between the elements 24 and 42 and to provide lubrication and cooling. In addition, the liquid in the compartment 112 provides a liquid barrier between the pumped fluid in the casing 14 and the sealing surfaces of the sealing elements. The sleeve 22 of this embodiment could also be fitted with agitators as in the FIG. 1 embodiment.

In both elements, the provision of the bellows provides insurance against separation of the sealing elements as a result of pressure fluctuations in the service water compartment. Even if there should be a reduction in pressure in this region, the bellows will serve to urge the sealing elements to their sealing condition. Also, tolerances are not as critical with seals of either type as in conventional mechanical seals. In the pumping of slurries, the impeller is often extremely robust and heavy, with the result that some deformation of the shaft takes place. Once again, the action of the bellows assists in maintaining sealing contact between the sealing surfaces of the elements 24 and 42.

Note that in both cases, the bellows is stationary i.e. fixed relative to the housing. This is to be contrasted with the situation in most conventional seals of the same general type, used in slurry pumping operations where the bellows is arranged to rotate to prevent the accumulation of solid matter which would hamper its operation. In accordance with this invention, the environment in which the bellows normally operates is a clean one provided by the service water so that there is little likelihood of fouling of the bellows. Even when service water injection fails, the agitators help in preventing such fouling.

In the embodiment of FIG. 1, the service water need only be injected into the compartment 54 at a pressure slightly in excess of the prevailing pressure in the pump casing 14. This is also in contrast to conventional arrangements where very high pressure service liquid is used to prevent damage to the sealing surfaces by slurry which would otherwise have access to the sealing surfaces. Note that, although express reference has been made to the use of service water other liquids may also be used in different applications of the seal.

I claim:

1. A pump seal for a pump used to pump difficult liquids such as slurries and corrosive liquids, the seal in use sealing the shaft of the pump relative to the casing of the pump through which the shaft passes rotatably from the interior to the exterior of the casing which defines, during pumping, a fluid space containing the difficult liquid under pressure, the seal being located within a housing fixed to the casing and surrounding the shaft, and the seal comprising:

first and third annular spaced sealing elements locatable fast with the shaft within the housing and each having a sealing surface;

an axially extensible annular bellows fixed non-rotatably at a point between its ends to the housing, the bellows being spaced radially from and surrounding the shaft to define an annular space between the bellows and shaft;

a second, annular sealing element carried at an end of the bellows away from the fluid space, the second sealing element having a sealing surface complemental in shape to that of the first sealing element and being located adjacent the first sealing element on the side thereof towards the fluid space;

a fourth annular sealing element carried at the opposite end of the bellows towards the fluid space, the fourth sealing element having a sealing surface complemental in shape to that of the third sealing element and being located adjacent the third sealing element on the side thereof away from the fluid space, the first and second sealing elements in combination, and the third and fourth sealing elements in combination defining respective ends of a service liquid compartment existing in the annular space between the bellows and shaft, the bellows resiliently urging the second and fourth sealing elements axially in opposite directions towards the first and third sealing elements respectively; and a radial inlet communicating with the interior of the service liquid compartment for the introduction of a fixed volume of pressurized service liquid into the compartment, the pressurized liquid in the compartment forcing the second and fourth sealing elements axially in opposite directions to seal against the first and third sealing elements respectively and creating a service liquid barrier preventing the difficult liquid from entering the service liquid compartment, getting between sealing surfaces of the sealing elements and deteriorating those surfaces.

2. The seal of claim 1 and including a fifth sealing element carried by the bellows at the end thereof carrying the fourth sealing element, the fifth sealing element having a sealing surface complemental in shape to another sealing surface of the third sealing element and being located adjacent the third sealing element on the side thereof towards the fluid space, the pressure of the difficult liquid during pumping forcing the fifth sealing element to seal against the third sealing element to create a seal between the shaft and the casing.

3. The seal of claim 1 in which the complemental sealing surfaces of the first, second, third and fourth sealing elements are tapered.

4. The seal of claim 2 in which the complemental sealing surfaces of the third and fifth sealing elements are tapered.

5. The seal of claim 1 and including a series of radial agitators extending into the service liquid compartment towards the bellows for rotation with the shaft and agitation of liquid in the compartment.

* * * * *